(12) United States Patent
Harada

(10) Patent No.: US 6,288,845 B1
(45) Date of Patent: Sep. 11, 2001

(54) PHOTOGRAPHIC OPTICAL SYSTEM AND PHOTOGRAPHING APPARATUS HAVING THE SAME

(75) Inventor: Akira Harada, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,951

(22) Filed: Dec. 7, 1999

(30) Foreign Application Priority Data

Dec. 11, 1998 (JP) .................................................. 10-375109

(51) Int. Cl.[7] .............................. G02B 3/00; G02B 9/00; G03B 17/00
(52) U.S. Cl. ......................... 359/664; 359/737; 359/754; 359/642; 396/448
(58) Field of Search .................................... 359/737, 738, 359/754, 642, 507, 511, 512, 648, 664; 396/448

(56) References Cited

U.S. PATENT DOCUMENTS

| 3,981,563 | * | 9/1976 | Nakamura | 359/749 |
| 4,096,506 | * | 6/1978 | Lange | 396/448 |
| 5,305,148 | * | 4/1994 | Ikemori et al. | 359/689 |
| 5,315,333 | * | 5/1994 | Nash | 359/508 |
| 6,052,233 | * | 4/2000 | Koike | 359/642 |

FOREIGN PATENT DOCUMENTS

| 5-19210-A | * | 1/1993 | (JP) | 359/664 |
| 6-160779 |   | 6/1994 | (JP) . | |

* cited by examiner

Primary Examiner—Evelyn A Lester
(74) Attorney, Agent, or Firm—Fitzpatrick, Cella, Harper & Scinto

(57) ABSTRACT

A photographic optical system for forming an image on a rectangular effective photographing area includes a photographic lens, and an optical member disposed on an object side of the photographic lens, both surfaces on the object side and an image side of the optical member having curvature in the same direction, wherein the following conditions are satisfied:

$2.5 < |r/f| < 100$ $f/L > 4$ where r is a smaller one of radii of curvature of the surfaces on the object side and the image side of the optical member, f is a focal length of the photographic optical system, and L is a diagonal length of the effective photographing area.

5 Claims, 7 Drawing Sheets

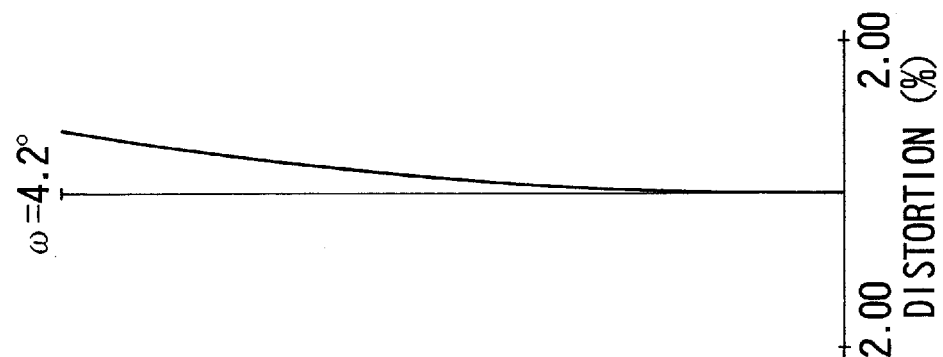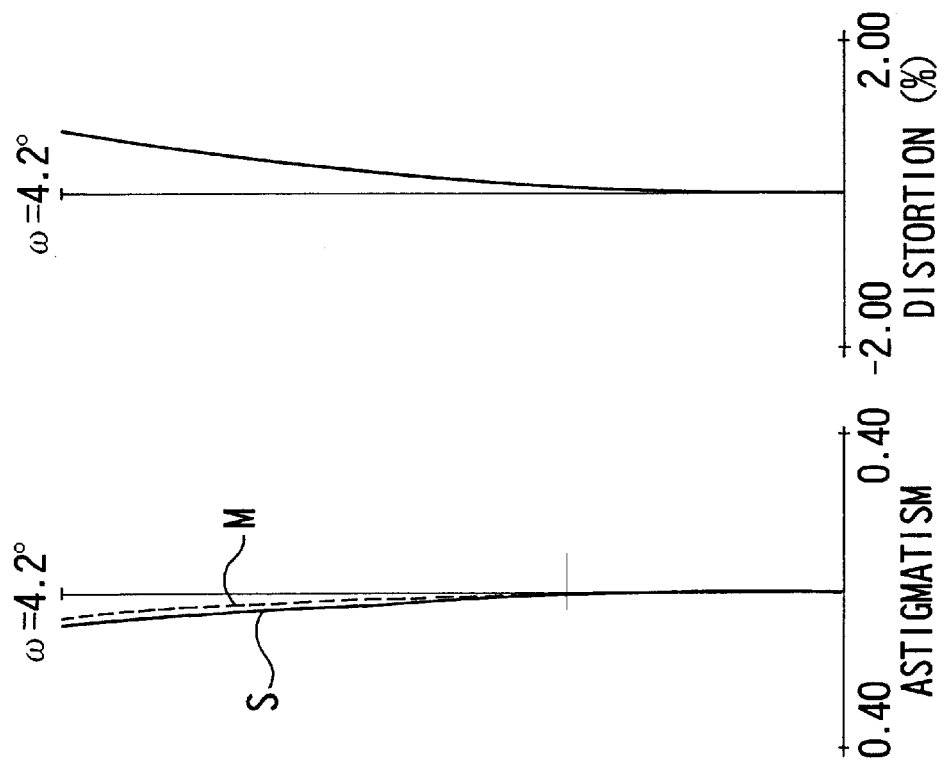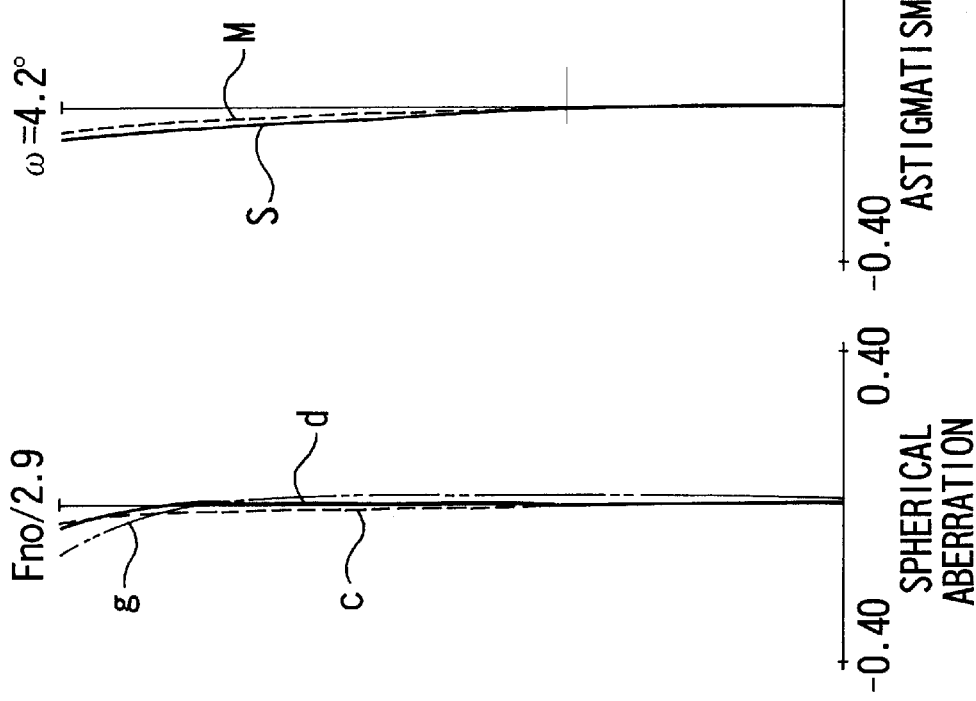

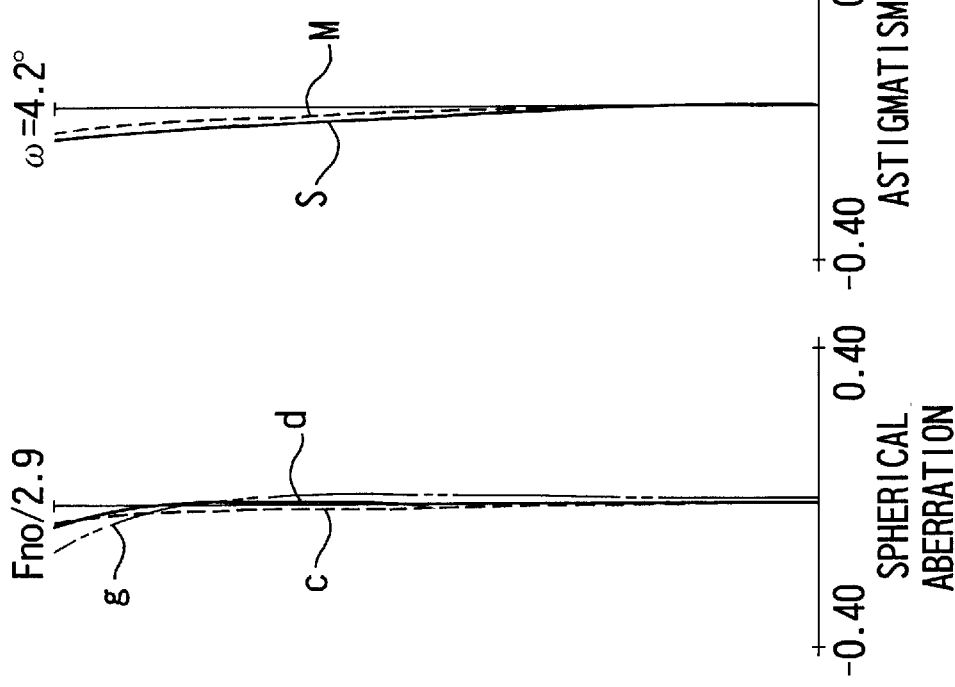

PHOTOGRAPHIC OPTICAL SYSTEM AND PHOTOGRAPHING APPARATUS HAVING THE SAME

BACKGROUND OF THE INVENTION

1. Field of the Invention

The present invention relates to photographic optical systems and photographing apparatuses and, more particularly, to a photographic optical system having an optical member, such as a light transmission member for lens protection or an optical filter, in front of a photographic lens, which is suited to video cameras, digital cameras, still video cameras and film cameras, and a photographing apparatus having the photographic optical system.

2. Description of Related Art

It has been known to provide cameras for photography, video cameras, still video cameras and like photographing apparatuses with a protection glass or optical filter in front of (or on the light entering side) of the photographic lens. In most of these photographing apparatuses, the protection glass or optical filter to be used is usually of the flat parallel form. Meanwhile, of the photographing apparatuses, an apparatus using a CCD or like image sensor as the recording medium has suffered from interreflection, because the image sensor and its cover glass have high refractivity at the surfaces thereof. The reflected light from these surfaces return to the members of the photographic lens and their mountings and therefrom are reflected to enter the image sensor again. In the prior art, therefore, there is a problem that ghost is often recorded. Particularly for the protection glass or optical filter, because it is attached to the very front of the lens system, ghost owing to the interreflection from its surfaces is apt to be formed on the image sensing surface of the image sensor, thus making the problem very serious.

With regard to this problem, in Japanese Laid-Open Patent Application No. Hei 6-160779, as the zoom lens has a protection glass at the very front thereof, each of its surfaces is made to have curvature in such a way as to diffuse the ghost on the image sensing surface. This method of reducing the influence of ghost is applied to sufficiently diffuse ghost in the wide-angle region. For this purpose, the protection glass is given large curvature.

Thus, the use of the optical member, such as a protection glass or optical filter, at the front of the photographic lens leads to a possibility of occurrence of interreflection between the surface of the image sensor and the surfaces of the optical member. To effectively prevent this interreflection from producing flare or ghost due to the incidence of reflected light on the image sensor, it is a good idea to make each surface of the optical member have curvature, as disclosed in Japanese Laid-Open Patent Application No. Hei 6-160779 mentioned above.

However, if the curvature of each surface of the optical member is made too strong, many aberrations increase largely, so that the overall optical performance of the photographic optical system is caused to lower. Conversely, if the curvature of each surface of the optical member is made too weak, the amount of light returning to the image sensor increases, leaving the flare or ghost produced at a high level.

BRIEF SUMMARY OF THE INVENTION

With the above-described background in mind, as an optical member, such as a light transmission member for lens protection or an optical filter, is attached to the front of the photographic lens, the present invention makes appropriate determination of curvature to be given individually to surfaces of the optical member. It is, therefore, an object of the invention to provide a photographic optical system which can effectively reduce the influence of ghost without having to cause deterioration of the optical performance of the entire optical system, and a photographing apparatus having the photographic optical system.

To attain the above object, in accordance with an aspect of the invention, there is provided a photographic optical system for forming an image on a rectangular effective photographing area, the photographic optical system comprising a photographic lens, and an optical member disposed on an object side of the photographic lens, both surfaces on the object side and an image side of the optical member having curvature in the same direction, wherein the following conditions are satisfied:

$$2.5 < |r/f| < 100$$

$$f/L > 4$$

where r is a smaller one of radii of curvature of the surfaces on the object side and the image side of the optical member, f is a focal length of the photographic optical system, and L is a diagonal length of the effective photographing area.

Further, in accordance with another aspect of the invention, there is provided a photographing apparatus comprising the above-described photographic optical system.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 4A to 4C are graphic representations of the photographic optical system according to the numerical example 2.

FIGS. 6A to 6C are graphic representations of the photographic optical system according to the numerical example 3.

DETAILED DESCRIPTION OF THE INVENTION

Hereinafter, preferred embodiments of the invention will be described in detail with reference to the drawings.

Figure 1:
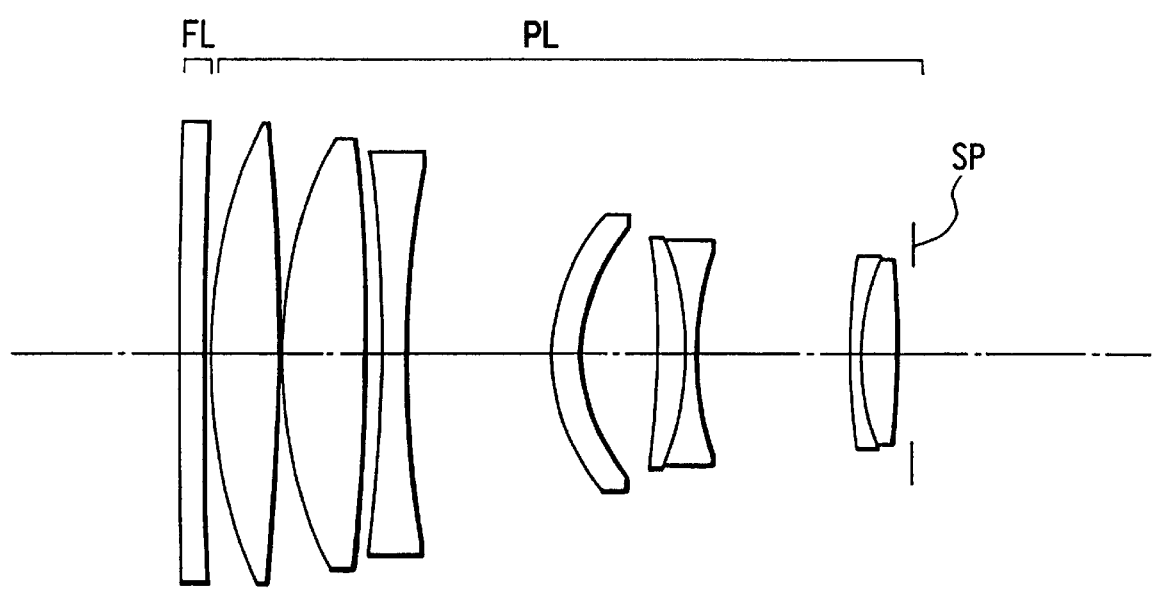
FIG. 1 is a longitudinal section view of a photographic optical system according to a numerical example 1.
Figure 2:
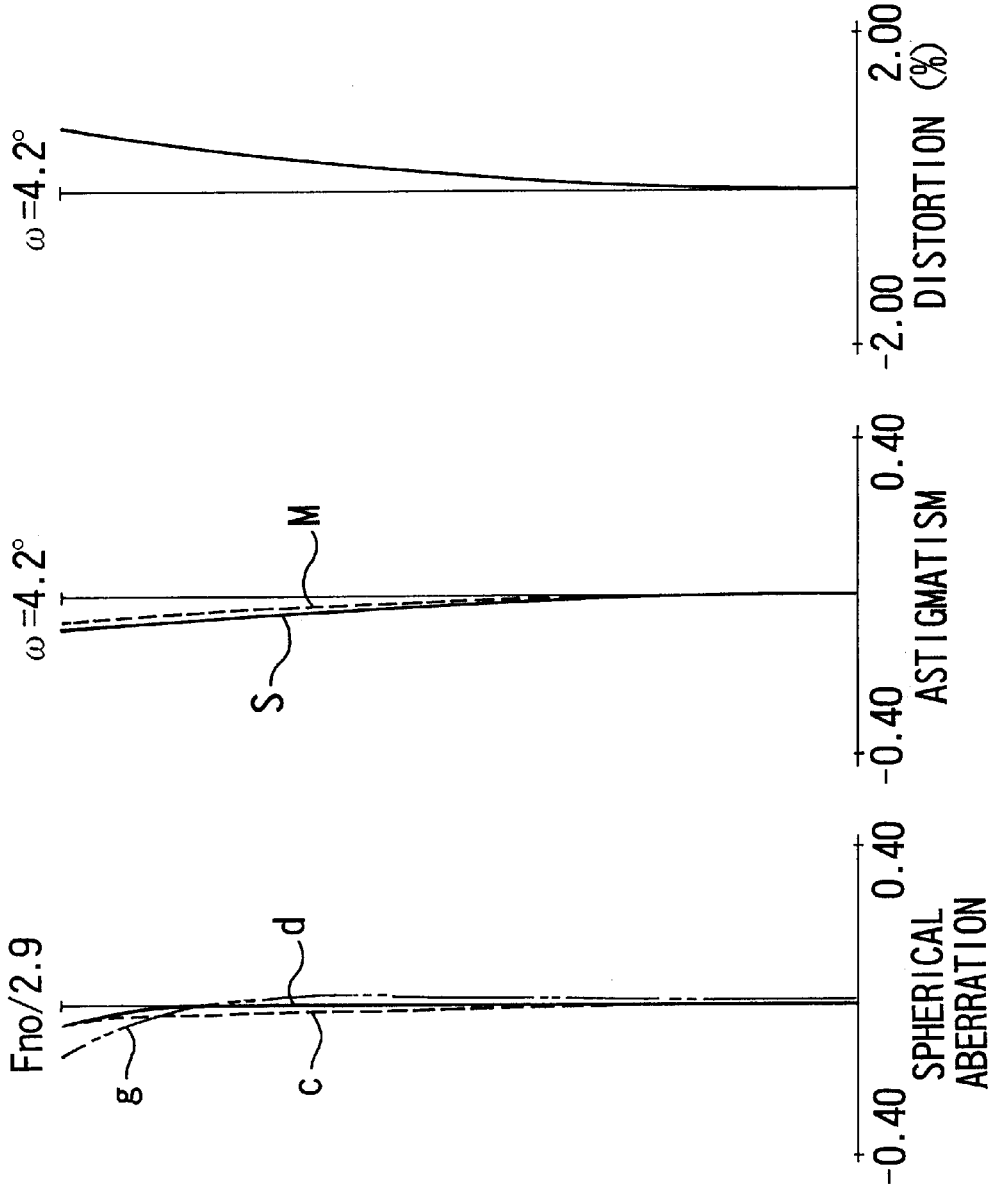
FIGS. 2A to 2C are graphic representations of the photographic optical system according to the numerical example 1.
Figure 3:
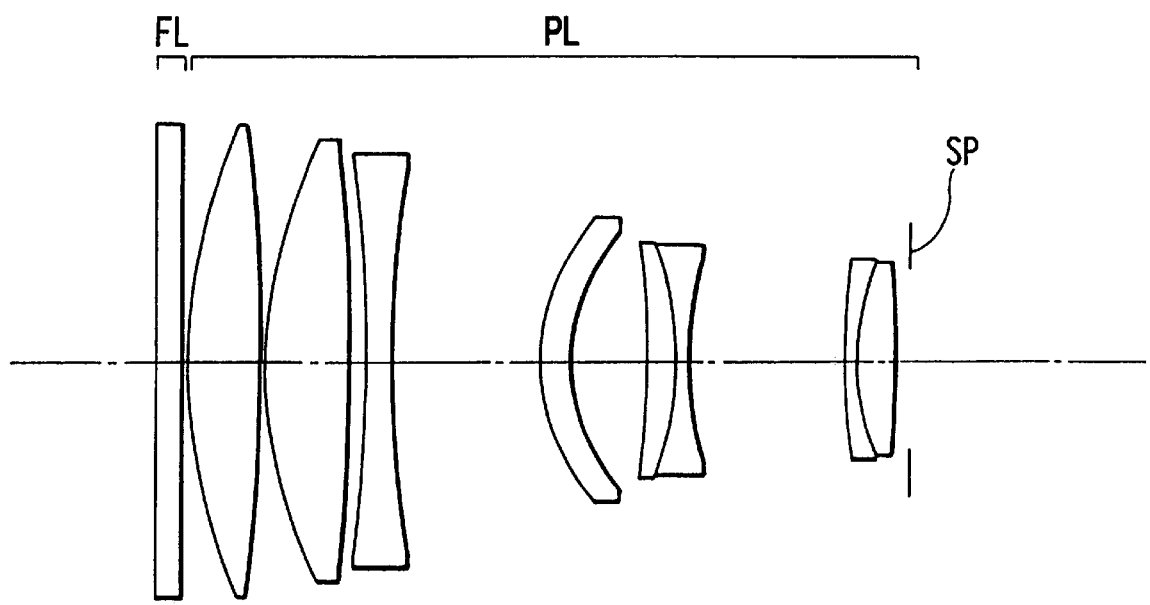
FIG. 3 is a longitudinal section view of a photographic optical system according to a numerical example 2.
Figure 5:
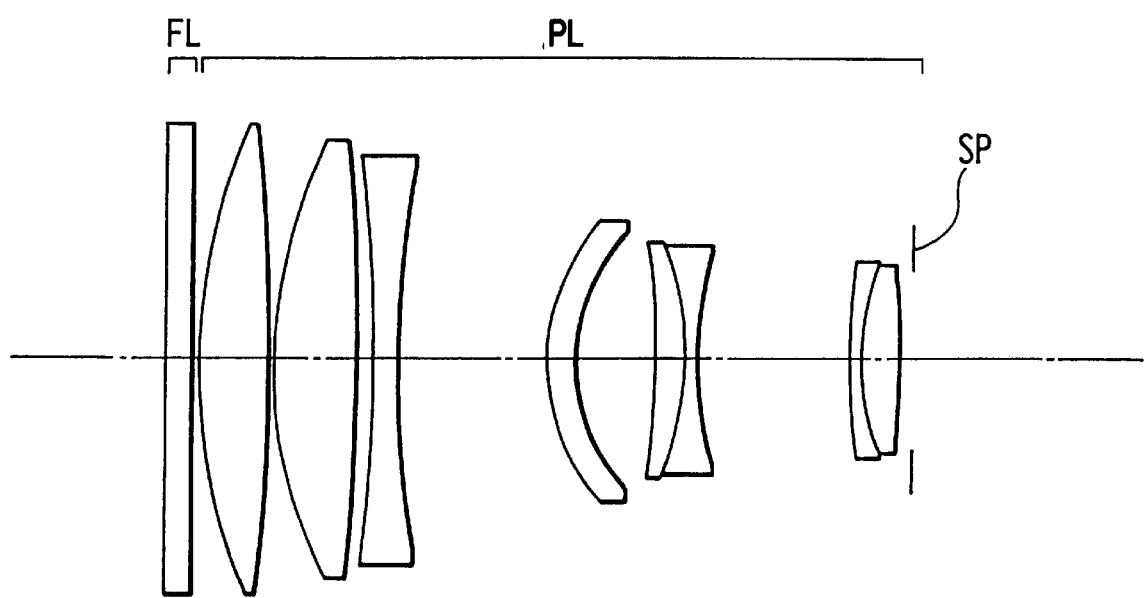
FIG. 5 is a longitudinal section view of a photographic optical system according to a numerical example 3.

FIGS. 1, 3 and 5 in block diagram show respectively the photographic optical systems according to the numerical examples 1, 2 and 3. FIGS. 2A to 2C, FIGS. 4A to 4C and FIGS. 6A to 6C show respectively the aberrations of the photographic optical systems according to the numerical examples 1, 2 and 3.

In FIGS. 1, 3 and 5, a photographic lens PL is not variable in focal length, or has a single (fixed) focal length. An optical member FL, such as a light transmission member for lens protection or an optical filter, is fixedly, or releasably, attached to the front of the photographic lens PL. SP stands for an aperture stop. Light from an object is imaged, through the optical member FL, the photographic lens PL and the aperture stop SP, on an image plane IP (not shown) on which a photographic film or an image sensor, such as a CCD, having a rectangular maximum effective photographing area is disposed.

In the present embodiment, both surfaces (the object-side surface and the image-side surface) of the optical member FL are made to have curvature in the same direction, and the following conditions are satisfied:

$$2.5 < |r/f| < 100 \tag{1}$$

$$f/L > 4 \tag{2}$$

where
- r: a smaller one of radii of curvature of the object-side surface and the image-side surface of the optical member FL,
- f: a focal length of the entire optical system (the photographic optical system, and
- L: a diagonal length of the effective photographing area on the image plane IP.

In the present embodiment, since both surfaces of the optical member FL are made to have curvature in the same direction and the power (refractive power) of the optical member FL is appropriately determined, the influence on the aberrations of the entire optical system can be reduced.

The inequalities of condition (1) are concerned with the radius of curvature of one of the surfaces of the optical member FL. When the lower limit of the condition (1) is exceeded, as this means that the smaller radius of curvature is too small, ghost is dispersed sufficiently on the image plane IP, but the optical member FL becomes unduly large in refractive power, causing various aberrations to increase objectionably. When the radius of curvature is too large beyond the upper limit, a weaker power is given to the optical member FL, so that, although the produced amount of aberrations decreases, ghost on the image plane IP does not diminish sufficiently.

When the lower limit of the condition (2) is exceeded, as this means that the focal length of the entire optical system is too short, each surface of the optical member FL is caused to have strong curvature in order to obtain sufficient dispersion of ghost on the image plane IP. Therefore, the influence on the aberrations increases largely.

The ratio of the maximum image height from the center of the image plane of a dispersion area of ghost on the image plane caused by the optical member, such as a light transmission member for lens protection or an optical filter, disposed at the frontmost position on the object side to the diagonal length of the effective photographing area is given, on the assumption that an object being photographed lies at infinity (as the entering light beam is considered to come along the optical axis of the lens system, or the on-axial light beam only is considered), by the following equation:

$$\alpha = \frac{2 \times f \times \tan\left(2 \times \sin^{-1} \frac{f}{2 \times r \times Fno}\right)}{L}$$

where
- f: a focal length of the entire optical system,
- r: a radius of curvature of a surface on the object side or the image side of the optical member, such as a light transmission member for lens protection or an optical filter,
- Fno: an F-number of the entire optical system,
- L: a diagonal length of the effective photographing area, and
- α: the ratio of the maximum image height of ghost to the diagonal length of the effective photographing area.

The ratio of the maximum image height of ghost to the diagonal length of the effective photographing area varies as a function of the focal length. For the zoom lens, the influence of ghost has to be reduced particularly in the wide-angle region. For this purpose, the curvature is increased. In the telephoto region, on the other hand, such a curvature becomes too much strong, producing large aberrations. To simultaneously fulfill the requirements of reducing the influence of ghost and of suppressing the influence on aberrations, it is, therefore, necessary to appropriately determine the amount of dispersion of ghost.

In the present embodiment, all design parameters are determined so as to satisfy the condition (2), the produced amount of ghost is reduced advantageously.

To further reduce the produced amount of ghost while still maintaining good optical performance, it is preferred that the numerical ranges of the conditions (1) and (2) are set forth as follows:

$$8.5 < |r/f| < 50 \tag{1a}$$

$$f/L > 5.5 \tag{2a}$$

Incidentally, it is desired that, in the present embodiment, the optical member, such as a light transmission member for lens protection or an optical filter, is attached to the mono (fixed)-focal-length photographic lens.

In application to the mono-focal-length photographic lens, it is possible to choose appropriate curvature of each surface of the optical member, such as a light transmission member for lens protection or an optical filter. This is advantageous at reducing the influence of ghost and suppressing the deterioration of aberrations. Also, in the present embodiment, the radii of curvature of the surfaces on the object side and the image side of the optical member, such as a light transmission member for lens protection or an optical filter, are made approximately equal to each other (the difference in radius of curvature being within ±10%) to thereby reduce the produced amount of aberrations.

Next, three numerical examples 1 to 3 are shown. In the numerical data for the examples 1 to 3, ri is the radius of curvature of the i-th surface, when counted from the object side, di is the i-th element thickness or air separation, when counted from the object side, and ni and vi are respectively the refractive index and Abbe number of the material of the i-th element, when counted from the object side. Here, f, Fno and 2ω are respectively the focal length, F-number and angular field of the entire optical system when focusing on an infinitely distant object. Also, the values of the factors of the above-described conditions (1) and (2) for the numerical examples 1 to 3 are listed in Table-1.

NUMERICAL EXAMPLE 1

| f = 293.44373 | Fno = 1:2.9 | 2ω = 8.4 | |
|---|---|---|---|
| r1 = 3000.000 | d1 = 6.00 | n1 = 1.51633 | v1 = 64.2 |
| r2 = 3000.000 | d2 = 1.00 | | |
| r3 = 131.223 | d3 = 15.50 | n2 = 1.43387 | v2 = 95.1 |
| r4 = −456.958 | d4 = 0.69 | | |
| r5 = 109.758 | d5 = 18.23 | n3 = 1.49700 | v3 = 81.6 |
| r6 = −503.471 | d6 = 3.45 | | |
| r7 = −366.505 | d7 = 5.55 | n4 = 1.72047 | v4 = 34.7 |
| r8 = 272.539 | d8 = 31.30 | | |
| r9 = 46.737 | d9 = 6.10 | n5 = 1.58913 | v5 = 61.2 |
| r10 = 41.176 | d10 = 17.08 | | |
| r11 = −209.801 | d11 = 6.00 | n6 = 1.80518 | v6 = 25.4 |
| r12 = −72.597 | d12 = 2.50 | n7 = 1.61340 | v7 = 43.8 |

-continued

| f = 293.44373 | | Fno = 1:2.9 | 2ω = 8.4 |
|---|---|---|---|
| r13 = 84.880 | d13 = 33.20 | | |
| r14 = 166.488 | d14 = 2.50 | n8 = 1.71300 | v8 = 53.9 |
| r15 = 56.556 | d15 = 8.00 | n9 = 1.61800 | v9 = 63.4 |
| r16 = −276.571 | d16 = 3.00 | | |
| r17 = Stop | | | |

NUMERICAL EXAMPLE 2

| f = 293.31427 | | Fno = 1:2.9 | 2ω = 8.4 |
|---|---|---|---|
| r1 = 10000.000 | d1 = 6.00 | n1 = 1.51633 | v1 = 64.2 |
| r2 = 10000.000 | d2 = 1.00 | | |
| r3 = 131.223 | d3 = 15.50 | n2 = 1.43387 | v2 = 95.1 |
| r4 = −456.958 | d4 = 0.69 | | |
| r5 = 109.758 | d5 = 18.23 | n3 = 1.49700 | v3 = 81.6 |
| r6 = −503.471 | d6 = 3.45 | | |
| r7 = −366.505 | d7 = 5.55 | n4 = 1.72047 | v4 = 34.7 |
| r8 = 272.539 | d8 = 31.30 | | |
| r9 = 46.737 | d9 = 6.10 | n5 = 1.58913 | v5 = 61.2 |
| r10 = 41.176 | d10 = 17.08 | | |
| r11 = −209.801 | d11 = 6.00 | n6 = 1.80518 | v6 = 25.4 |
| r12 = −72.597 | d12 = 2.50 | n7 = 1.61340 | v7 = 43.8 |
| r13 = 84.880 | d13 = 33.20 | | |
| r14 = 166.488 | d14 = 2.50 | n8 = 1.71300 | v8 = 53.9 |
| r15 = 56.556 | d15 = 8.00 | n9 = 1.61800 | v9 = 63.4 |
| r16 = −276.571 | d16 = 3.00 | | |
| r17 = Stop | | | |

NUMERICAL EXAMPLE 3

| f = 293.37112 | | Fno = 1:2.9 | 2ω = 8.4 |
|---|---|---|---|
| r1 = 50000.000 | d1 = 6.00 | n1 = 1.51633 | v1 = 64.2 |
| r2 = 5000.000 | d2 = 1.00 | | |
| r3 = 131.223 | d3 = 15.50 | n2 = 1.43387 | v2 = 95.1 |
| r4 = −456.958 | d4 = 0.69 | | |
| r5 = 109.758 | d5 = 18.23 | n3 = 1.49700 | v3 = 81.6 |
| r6 = −503.471 | d6 = 3.45 | | |
| r7 = −366.505 | d7 = 5.55 | n4 = 1.72047 | v4 = 34.7 |
| r8 = 272.539 | d8 = 31.30 | | |
| r9 = 46.737 | d9 = 6.10 | n5 = 1.58913 | v5 = 61.2 |
| r10 = 41.176 | d10 = 17.08 | | |
| r11 = −209.801 | d11 = 6.00 | n6 = 1.80518 | v6 = 25.4 |
| r12 = −72.597 | d12 = 2.50 | n7 = 1.61340 | v7 = 43.8 |
| r13 = 84.880 | d13 = 33.20 | | |
| r14 = 166.488 | d14 = 2.50 | n8 = 1.71300 | v8 = 53.9 |
| r15 = 56.556 | d15 = 8.00 | n9 = 1.61800 | v9 = 63.4 |
| r16 = −276.571 | d16 = 3.00 | | |
| r17 = Stop | | | |

TABLE 1

| Condition | Numerical Example | | |
|---|---|---|---|
| No. & Factor | 1 | 2 | 3 |
| (1) $|r/f|$ | 5.12 | 17.07 | 8.53 |
| (2) f/L | 6.8 | 6.8 | 6.8 |

Next, an embodiment of the photographing apparatus having one of the photographic optical systems of the numerical examples 1 to 3 is described with reference to FIGS. 7A and 7B.

Figure 7A:
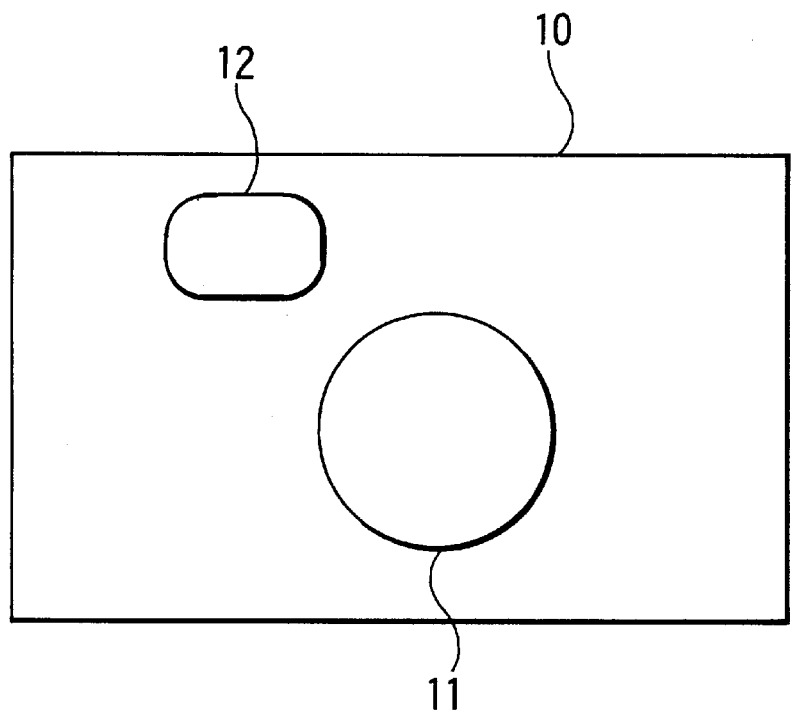
FIGS. 7A and 7B are schematic diagrams of a photographing apparatus having any one of the photographic optical systems according to the numerical examples 1 to 3.
Figure 7B:
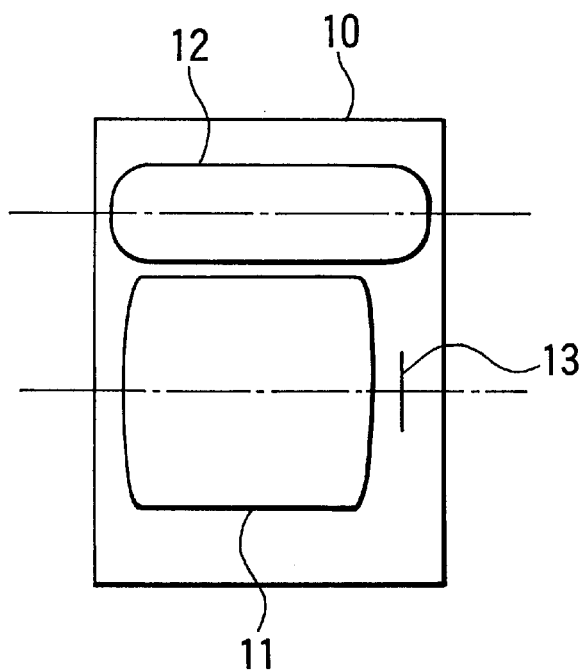

FIG. 7A is a front view of the photographing apparatus. FIG. 7B is a side sectional view of the photographing apparatus. In FIGS. 7A and 7B, the photographing apparatus is housed in a casing 10, having incorporated therein the photographic optical system 11 of one of the numerical examples 1 to 3, a viewfinder optical system 12 and a photosensitive surface 13 at which is arranged photographic film, or an image sensor such as a CCD.

In such a manner, the photographic optical system of one of the numerical example 1 to 3 is applied to the photographing apparatus. It is thus made possible to realize a photographing apparatus which has reduced the influence of ghost advantageously without deteriorating the optical performance.

It will be appreciated from the foregoing that, according to the above-described embodiments, the curvature of each surface of the optical member, such as a light transmission member for lens protection or an optical filter, disposed at the front of the photographic lens is appropriately determined, so that it is possible to attain a photographic optical system or a photographing apparatus capable of effectively reducing the influence of ghost without deteriorating the optical performance of the entire optical system.

What is claimed is:

1. A photographic optical system for forming an image on a rectangular effective photographing area, said photographic optical system comprising:

a photographic lens; and an optical member disposed on an object side of said photographic lens, both surfaces on the object side and an image side of said optical member having curvature in the same direction, wherein the following conditions are satisfied:

$$2.5 < |r/f| < 100$$

$$f/L > 4$$

where r is a smaller one of radii of curvature of the surfaces on the object side and the image side of said optical member, f is a focal length of said photographic optical system, and L is a diagonal length of the effective photographing area.

2. A photographic optical system according to claim 1, wherein said photographic lens is a mono-focal length lens system.

3. A photographic optical system according to claim 1, wherein the radii of curvature of the surfaces on the object side and the image side of said optical member are substantially equal to each other.

4. A photographic optical system according to claim 1, further satisfying the following conditions:

$$8.5 < |r/f| < 50$$

$$f/L > 5.5$$

5. A photographing apparatus comprising a photographic optical system according to claim 1.

* * * * *

UNITED STATES PATENT AND TRADEMARK OFFICE
CERTIFICATE OF CORRECTION

PATENT NO. : 6,288,845 B1  
DATED : September 11, 2001  
INVENTOR(S) : Akira Harada Page 1 of 1

It is certified that error appears in the above-identified patent and that said Letters Patent is hereby corrected as shown below:

<u>Column 5,</u>  
Line 37, "r1 = 50000.000" should read -- r1=5000.00 --.

Signed and Sealed this

Seventh Day of May, 2002

*Attest:*

*Attesting Officer*

JAMES E. ROGAN  
*Director of the United States Patent and Trademark Office*